May 21, 1968  A. MOTTU  3,383,958
BORING OR DRILLING MACHINE
Filed Nov. 26, 1965  4 Sheets-Sheet 1

INVENTOR
André MOTTU

United States Patent Office 3,383,958
Patented May 21, 1968

3,383,958
BORING OR DRILLING MACHINE
André Mottu, Geneva, Switzerland, assignor to Societe Genevoise d'Instruments de Physique, Geneva, Switzerland, a firm
Filed Nov. 26, 1965, Ser. No. 509,822
Claims priority, application Switzerland, Dec. 18, 1964, 16,406/64
4 Claims. (Cl. 77—3)

ABSTRACT OF THE DISCLOSURE

A boring or drilling machine in which the work-support is movable in a direction normal to the axis of the tool-spindle and the spindlehead or spindle support is carried by a vertical column, the head being formed in two parts, the first being fixed against movement in the horizontal direction and carrying the rear end of the spindle and its driving means, the second carrying the front end of the spindle and being supported on slides on the first part for being able to move parallel to the axis of the latter, the front end of the spindle, with that part of the head which carries it, being retractable into a position in which it is set back with respect to the front face of the column carrying the head.

---

Figure 1:
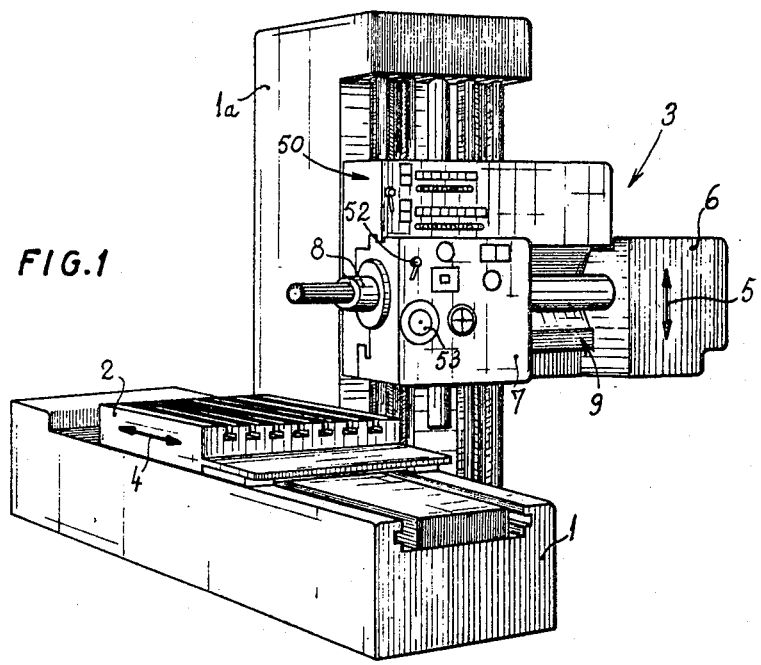

The present invention relates to a boring or drilling machine of the type in which the work-table is movable in a direction normal to the axis of the tool-spindle and in which the spindle head or spindle support is carried by a vertical column.

In boring machines of the above-mentioned type, it is necessary to provide a device for spacing the table and the nose or front end of the spindle in order to facilitate the fitting of the tool on the spindle and the removal thereof. To this end the column carrying the spindlehead has heretofore been mounted for movement away from the table; this arrangement has the effect of increasing the risk of the development of deformation or distortion with consequential increased risk of non-alignment between the tool and the workpiece.

In order to avoid this drawback, it has been proposed to facilitate the placing in position and removal of the tool not by moving the column away from the table, but by making the latter movable horizontally, not only in a direction normal to the axis of the spindle, but also in a direction parallel to such axis.

With this arrangement, however, the framework carrying the table is liable to impede the operator; moreover, since the table is relatively heavy, as are the parts to be machined which the table is intended to carry, its movement along horizontal slides parallel to the axis of the spindle, that is to say slides normal to the largest dimension or length of such table and which slides are necessarily short, also creates a risk of non-alignment.

An object of the present invention is to provide a novel solution to the above-mentioned problem which does not have the drawbacks of the known solutions.

In the boring machine according to the invention, the spindlehead is in two parts, the first, which is fixed in the horizontal plane and fast with a set of slides, carrying the rear end of the spindle and its driving means, and the second, which is supported by the said slides, carrying the front end of the spindle and is able to move parallel to the axes of the latter, such that the front end of the spindle, with that part of the head which carries it, can be retracted into a position in which it is set back with respect to the front face of the column carrying the head.

Figure 5:
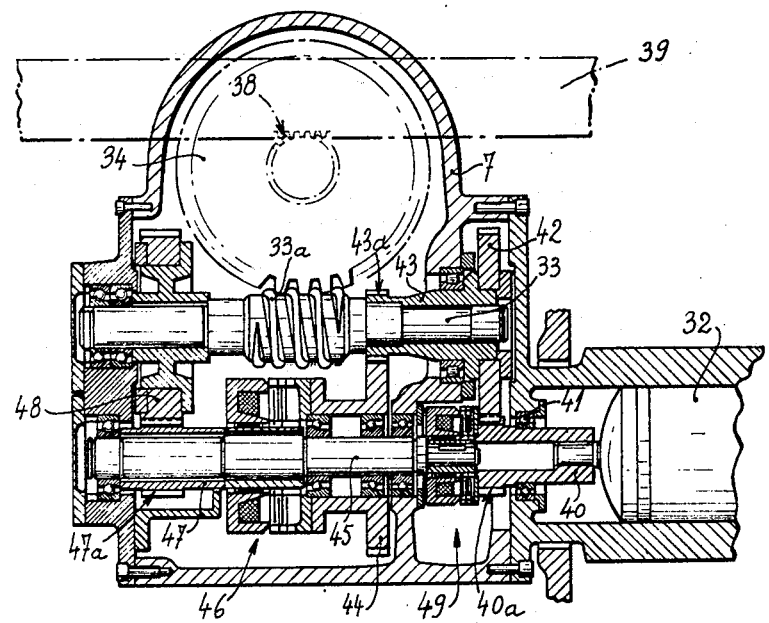
Figure 2:
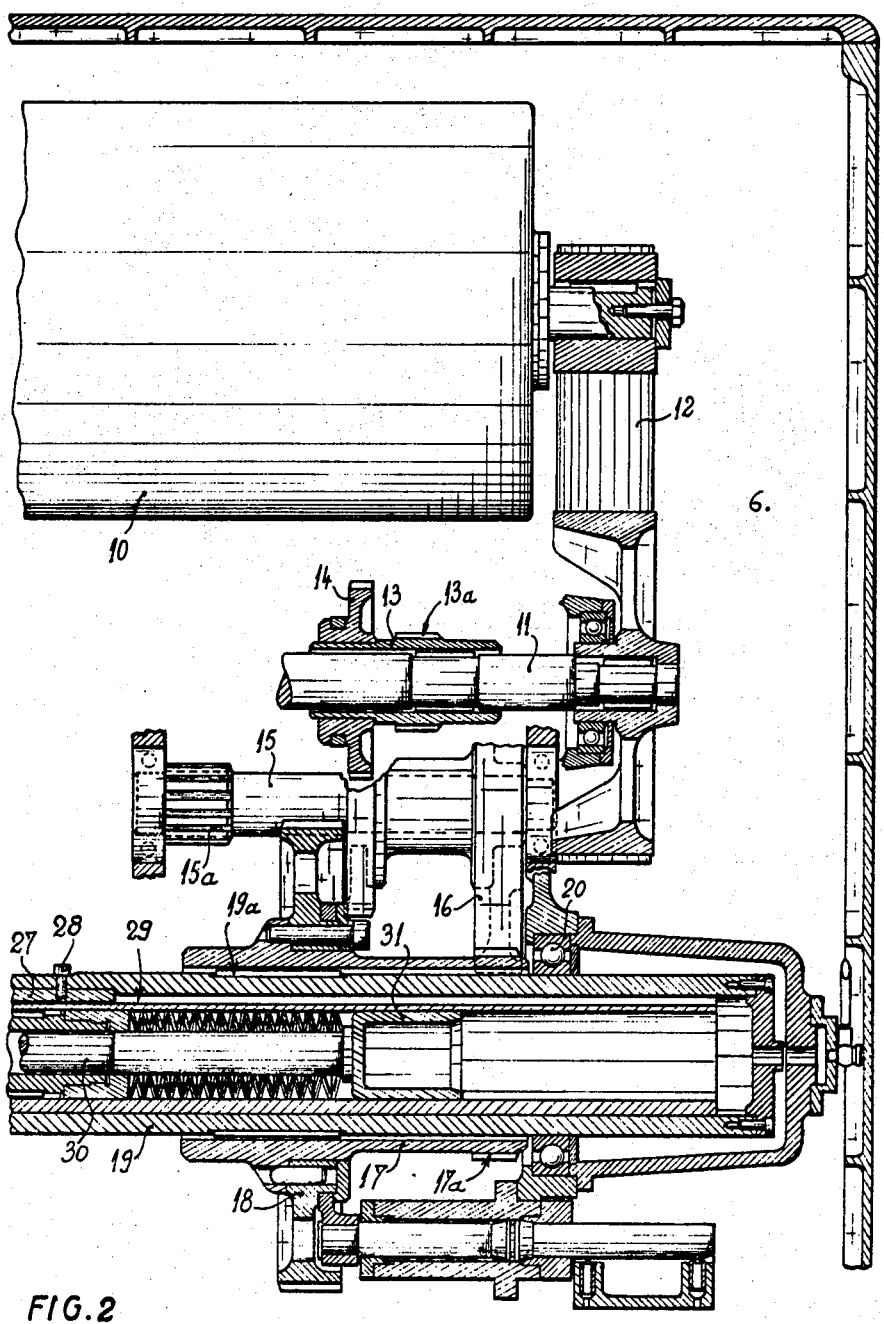
Figure 3:
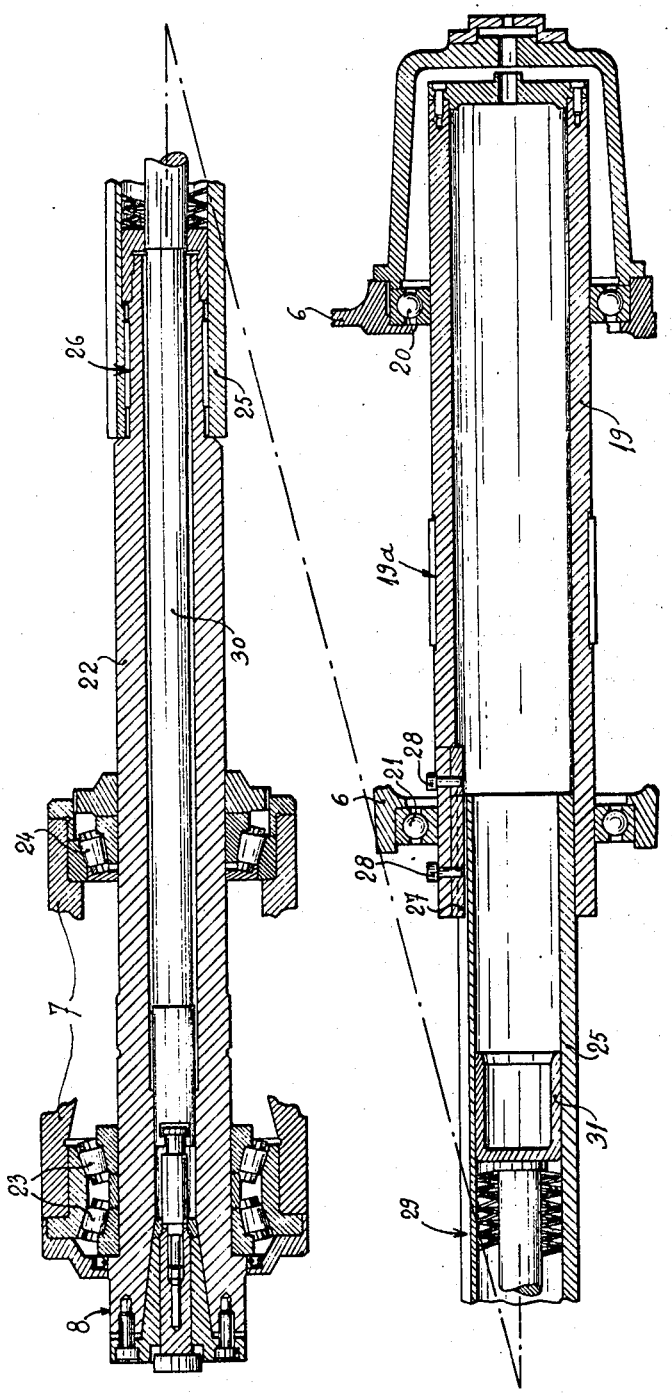
Figure 4:
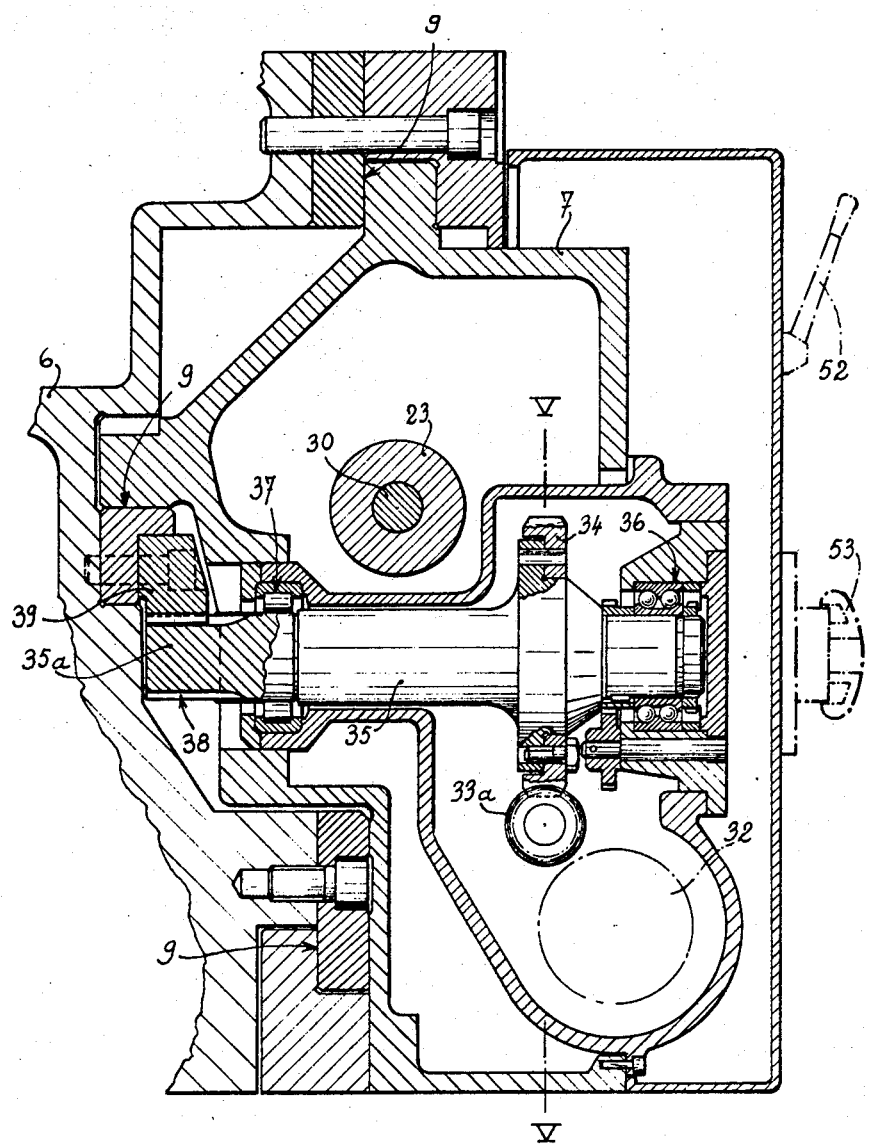

The drawing shows, by way of example, one embodiment of a boring or drilling machine according to the invention. In the drawings:

FIG. 1 is a perspective view of a boring machine with horizontal work-table and tool-spindle;
FIG. 2 is a section on a larger scale of a detail of a part of the spindlehead or spindle support, along the axis of the spindle;
FIG. 3 is an axial section of the spindle;
FIG. 4 is a section of the movable front part of the spindlehead at right angles to the axis of the spindle, and
FIG. 5 is a section on the line V—V of FIG. 4.

The boring machine shown comprises a bed 1 carrying a table 2 and provided with a column 1a carrying the spindlehead, which is designated generally by the reference 3. The table 2 moves in a single direction which is indicated by the reference 4 in FIG. 1 and is normal to the axis of the spindle, while the head 3 moves vertically on the column 1a in the direction of the arrow 5.

The body of the head 3 comprises a main part 6 carried by the column 1a and a part 7 carrying the front portion of the spindle and in particular the spindle nose designated by the reference 8. The said part 7 of the head is supported by the main part 6 and can move along slides 9 on part 6 in a direction parallel to the axis of the spindle.

The main part 6 of the head carries the rear portion of the spindle and its driving motor, which is designated by the reference 10( FIG. 2), and the transmission means providing the connection between the said motor and the spindle. The transmission means comprises in particular a gearbox, the primary shaft of which, designated by the reference 11 and driven by the motor 10 through the medium of a belt 12, carries a sliding sleeve 13 having teeth 13a and carrying a driving gear 14. The said sleeve 13 drives, either by means of its teeth 13a or by means of the gear 14, and according to the axial position occupied by the sleeve, a secondary shaft 15 having teeth 15a and carrying a driving gear 16. This secondary shaft 15 is fixed axially and drives a sleeve 17 coaxial with the spindle and which is furnished with teeth 17a and carries a gear 18. The sleeve 17 is movable axially so that it can be driven by the secondary shaft 15 either by means of its teeth 17a or by means of the gear 18, according to the axial position occupied by the sleeve.

The spindle proper has an axially-fixed tubular rear portion 19 rotating in ball bearings 20 and 21 (FIG. 3) carried by the main part 6 of the head. The sleeve 17, which is internally splined, slides on this tubular element 19 of the spindle and rotatably drives it through keys carried by the sleeve.

The spindle comprises an axially bored front portion 22, the end of which forms the spindle nose 8, and which rotates in bearings 23 and 24 carried by the part 7 of the head, and a tubular median portion 25 screwed on to the part 22 at 26 and mounted slidably in the tubular rear portion 19. The said rear portion carries internally a key 27 fixed by means of screws 28 and sliding in a longitudinal groove 29 in the intermediate tubular element 25 so as to ensure connection between the said two parts of the spindle during rotation.

The spindle comprises a device for locking and unlocking the tool and which is controlled by an axial rod 30 extending through the element 22 and a portion of the element 25 of the spindle and terminating in a thimble 31 fitted in the element 25. This thimble forms a piston, so that the rod 30 can be shifted hydraulically or pneumatically by a control system (not shown).

The movements of the part 7 of the head along the slides 9 with respect to the part 6 are obtained by means of a motor 32 which is partially shown (FIG. 5) and which drives through the medium of a gearbox described hereinafter, a shaft 33 carrying a worm 33a meshing with a ring gear 34. The ring gear 34 is carried by a shaft 35 (FIG. 4) mounted rotatably in the part 7 of the head through the medium of bearings 36 and 37 and one end 35a of the shaft 35 has teeth 38 meshing with a fixed rack 39 carried by the part 6 of the head and extending parallel to the slides 9. Thus, when the shaft 35 rotates in one direction or the other, the part 7 of the head is shifted in one direction or the other along the slides 9.

The motor 32 and the worm 33 are connected in the following manner. A sleeve 40 turning in a bearing 41 (FIG. 5) is driven by the motor 32, this sleeve 40 being fitted with teeth 40a meshing with a gear 42 carried by a sleeve 43 mounted loosely on one of the ends of the shaft 33. The sleeve 43 is provided with teeth 43a meshing with a gear 44 mounted loosely on a shaft 45 disposed as an extension of the shaft of the motor 32. The gear 44 can be made fast, by means of a clutch 46, with a sleeve 47 carried by the shaft 45 and which has teeth 47a meshing with a gear 48 keyed on the shaft 33.

A second speed is obtained when the clutch 46 is disengaged, the sleeve 40 driven by the motor 32 being then connected directly to the shaft 45 carrying the sleeve 47 by a clutch 49.

The present arrangement makes the spindle nose retractable with respect to its working position, in which position the spindle nose is shown in FIG. 1. In fact, the slides 9 of the part 6 of the head extend rearwardly on the right of the front part 7 of the head as seen in FIG. 1, and this enables this latter part to be shifted in this direction so that it is set back with respect to the front face, designated by the reference 50, of the part 6 of the head, which front face is flush with the front face of the column 1a. Thus, without having to provide for horizontal spacing of the column 1a with respect to the table 2, it is possible, in order to effect the fixing and removal of the tool, to bring the front portion 8 of the spindle into a retracted position in which the tool, such as the tool 51 shown in FIG. 1, is no longer perpendicularly above the table 2, but is set back with respect to the latter. Thus, tools can be changed conveniently and easily.

It is to be appreciated that the control means for the spindle, which are shown diagrammatically at 52 and 53 in FIGS. 1 and 4, are carried by the movable part 7 of the head.

The above-described arrangement does not prejudice the precision of the machine by reason of the fact that the front part of the head is reliably and accurately guided by slides which may be amply dimensioned, and that it is of relatively low weight since the spindle motor, the gearbox and its transmission means are carried by the main part of the head.

Various modifications of the above-described arrangement are possible within the scope of the invention, as defined by the appended claims.

What I claim is:

1. A boring or drilling machine comprising a spindle support, a tool-spindle carried by said spindle support and adapted for being driven about an axis of rotation, a work-support movable solely in a direction normal to the axis of the tool-spindle, a vertical column supporting said spindle support for vertical movement therealong, said column having a front face adjacent said work support, said head comprising two parts, a first of which is fixed against movement in a horizontal direction and includes horizontal slides thereon extending parallel to the axis of the spindle, the second part of the head being mounted on said slides for movement therealong, means for driving the spindle in rotation, said driving means being supported in said first part, said spindle having front and rear ends and including first and second telescopic portions, the rear end of the spindle being supported in said first part, the front end of the spindle being supported by said second part of the head, such that the front end of the spindle, with that part of the head which carries it, can be retracted into a position in which it is set back with respect to the front face of the column carrying the head.

2. In a machine as claimed in claim 1, wherein said first and second telescopic portions of the spindle are constituted as two tubular elements sliding longitudinally one within the other and keyed against relative rotation.

3. In a machine as claimed in claim 1, wherein the driving means comprises a motor and transmission members carried by the fixed first part of the head.

4. In a machine as claimed in claim 1, comprising control means for the spindle carried by the movable second part of the head.

References Cited

UNITED STATES PATENTS

| | | | |
|---|---|---|---|
| 2,864,269 | 12/1958 | Mottu | 77—3 |
| 2,052,271 | 8/1936 | Archea | 77—3 |
| 2,345,060 | 3/1944 | Morton | 77—3 |
| 2,945,401 | 7/1960 | Howey et al. | 77—3 |
| 3,232,141 | 2/1966 | Swanson et al. | 77—3 |

FOREIGN PATENTS

| | | |
|---|---|---|
| 1,454,818 | 8/1966 | France. |

GERALD A. DOST, *Primary Examiner.*